United States Patent Office 3,365,487
Patented Jan. 23, 1968

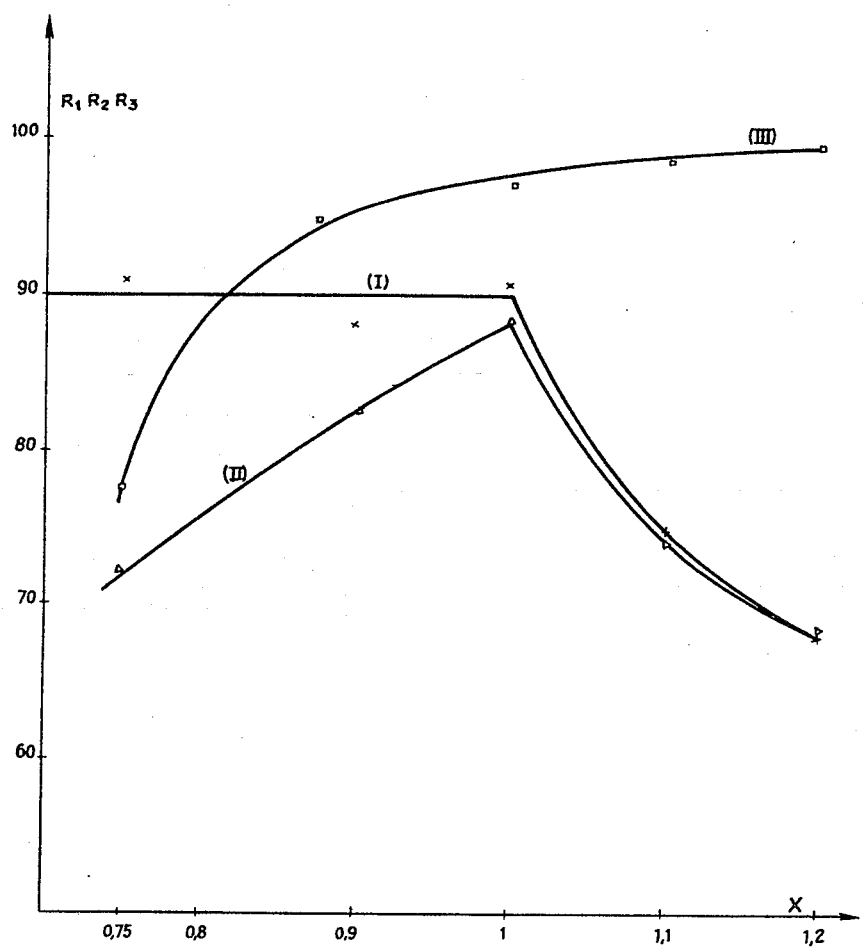

3,365,487
PROCESS FOR PREPARING BENZENE AND CYCLOHEXANE POLYCARBOXYLIC PERACIDS
Pierre Gouse, Lyon, France, assignor to L'Air Liquide, Societe Anonyme pour l'Etude et l'Exploitation des Procedes Georges Claude
Filed Jan. 2, 1964, Ser. No. 335,133
Claims priority, application France, Jan. 11, 1963, 921,148; Sept. 11, 1963, 947,142
9 Claims. (Cl. 260—502)

The present invention relates to the preparation of peracids, and more especially to the production of benzene polycarboxylic peroxyacid acids, optionally halogenated, nitrated, sulphonated, hydrogenated or alkylated on one or more carbons of the aromatic nucleus, by reaction of the anhydrides corresponding to the desired peracids with a peroxidised compound.

It is already known to prepare one of the peracids of the invention, monoperphthalic acid, by reacting hydrogen peroxide with phthalic anhydride in the aqueous phase, in alkaline medium acidified at the end of the reaction. This method and its variants are described in Organic Syntheses, volume III, p. 619 (1955), and by G. B. Payne in Journal of Organic Chemistry, volume 24, p. 1354 (1959), as also in U.S. Patent No. 2,284,477, issued May 26, 1942. In the absence of alkali cation, the perhydrolysis reaction may also be catalysed by oxides of tertiary amines, as in French Patent No. 1,265,609 of August 18, 1960, or it may be promoted by a temperature rise as described in U.S. Patent No. 2,273,774, issued Feb. 17, 1942.

In all cases, it is necessary, for isolating this peracid, to evaporate the aqueous solutions or their organic extract. These operations appreciably reduce the yields and are not without danger, especially if the peracid is extracted with ether.

Consequently, such methods are used only for the production of peracid solutions which are to be employed as such, for example for carrying out oxidations, bleaching operations of epoxidations.

It is possible by means of the process of the present invention to obtain dry and stable mixtures based upon peracids in high yield without resorting to evaporation.

This process, in which the anhydrides corresponding to the desired peracids and a peroxidised compound, used in a proportion of 0.5 to 1.5 atom of active oxygen per dicarboxylic anhydride function, are reacted in organic medium in the presence of an alkali mineral agent, is characterised in that there is employed an organic solvent in which the persalts formed are insoluble, and the latter are separated by precipitation of the reaction mixture, or in the form of a concentrated aqueous solution, whereafter they are optionally converted into the corresponding acids by dry treatment or in solution by means of a mineral acid, in a manner known per se.

The performance of the process of the invention as applied to phthalic anhydride and to substituted or mixed phthalic anhydrides, leads to monoperoxyacids in the form of alkali salts or in acid form.

Several of these products are stable and exhibit a very high oxidising power, in particular some substituted benzene dicarboxylic peroxyacids, exhibit a greater oxidising power than monoperphthalic acid, so that they may be employed in small proportions, especially for bleaching operations. In the following, these terms will be denoted by the generic term "persalt" or "peracid," depending upon whether it is a question of a substance in which one or more carboxyl or percarboxyl functions are neutralised or of a substance in which the carboxyl or percarboxyl functions are all in acid form.

The anhydride treated in accordance with the process of the invention is an anhydride of a benzene polycarboxylic acid, optionally halogenated, nitrated, sulphonated, hydrogenated or alkylated on one or more carbons of the aromatic nucleus.

These substances may be assimilated to substituted derivatives of phthalic anhydride

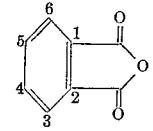

Of the anhydrides suitable for the process for the preparation of the perphthalic and hydroperphthalic acids according to the invention, there will be mentioned by way of example, without implying any limitation: phthalic anhydride, mononitrophthalic anhydrides substituted in the 3- and 4-positions, monochlorophthalic anhydrides substituted in the 3-, 4- and 5-positions, monosulphophthalic anhydrides in the 3- or 4-position, dinitrophthalic anhydrides in the 3-5-position, and dichlorophthalic anhydrides in the 3-4-, 3-5- or 4-5-positions, tri- or tetrahalogenated anhydrides such as tetrachlorophthalic anhydride, trimellitic or monocarboxyphthalic anhydride, pyromellitic and mellitic or dicarboxyphthalic and tetracarboxyphthalic anhydrides, or mixtures of these substances which result from the oxidising treatment of wood charcoals. It is also possible to use after dehydration mixtures of mono- and polychlorinated or mono- and polynitrated acids such as result from chlorination or nitration.

It is also possible to treat the anhydride of a substituted or unsubstituted cyclohexanepolycarboxylic acid, for example hexahydrophthalic anhydride, mono- or dihalogenotetrahydrophthalic anhydrides, mono- or dihalogenonadic anhydrides (or 3-6-endomethylene-cyclohexane-1-2-dicarboxylic anhydrides), cyclohexanehexacarboxylic anhydride, which substances may be assimilated to derivatives of phthalic anhydride by the addition of atoms or radicals to the carbons of the aromatic nucleus.

The organic solvents employed for the preparation of the peracids and persalts of the present invention are preferably the esters of carboxylic acids containing in their molecules from 1 to 10 carbon atoms, such as the esters of acetic acid, and there may be mentioned by way of example the methyl, ethyl, propyl, isopropyl, butyl, amyl and heptyl acetates. The ethyl, isopropyl and butyl acetates are particularly advantageous.

These solvents do not mix readily with water and are recovered by decantation after each peroxidising reaction. They may be used in the pure state or saturated with water. The organic medium in which the reaction is carried out may consist of a mixture of esters.

To this medium there is added, for example, hydrogen peroxide in the form of an aqueous solution in a concentration between 25% and 95%, preferably of 65% or 70%. The hydrogen peroxide may be replaced by one of the solid sources of active oxygen, such as the mineral or organic peroxyhydrates or the mineral peroxides such as sodium peroxide. In the majority of cases, the reaction is carried out with an approximately stoichiometric quantity of active oxygen, the molecular ratio of hydrogen peroxide to carboxylic anhydride function being between 0.5 and 1.5 and preferably equal to 1.1.

The reaction medium also contains an alkaline agent which is added before or after the peroxidising agent and the anhydride or anhydrides. The alkaline reactant, of which the cations are intended partially to neutralise the peracid formed, is in a quantity such that the molecular ratio of cation to carboxylic anhydride function is between 0.7 and 1.2 and preferably equal to 1. However, for cyclic operations in which there may be precipitated in the form of a salt only a portion of the peracid formed, lower ratios of alkali cation to carboxylic anhydride function, for example between 0.2 and 0.7 may then be employed.

The alkaline agent may be a hydroxide such as sodium or potassium hydroxide, which is added in solid form or in the form of a concentrated aqueous or alcoholic solution. It is also possible to use a concentrated aqueous solution of ammonia, or gaseous ammonia. It is also possible to use alkali or ammonium carbonates in solid form or in the form of aqueous solutions.

Although the alkaline agent may be added to the medium in one lot or in successive portions, it has been found that it is preferable to introduce it gradually and after the addition of the hydrogen peroxide and of the anhydride. The quantity of alkaline agent or ammonia necessary for partial or complete neutralisation of the first acidity of the peracid is measured in advance or in the course of the reaction by following the variation of the pH value of the solution.

The difference between the pK values of the carboxylic and percarboxylic acid functions is sufficiently great to facilitate selective neutralisation (percarboxylic pK generally between pH 7 and 9).

During the addition of the alkaline reactant to the reaction medium, there is observed in a first phase a complete dissolution of the anhydride or anhydrides as the peroxidation proceeds. This phenomenon is advantageous in that it makes it possible to use relatively large quantities of anhydrides as compared with the total reaction volume. In a second phase corresponding to the end of the addition of the alkaline agent, the persalt precipitates and thereafter the suspension is stirred for about 1 hour before being filtered.

In the course of all the preceding operations, the temperature is preferably maintained between 10° and 30° C., which can be done without difficulty because the reactions exhibit little exothermicity.

The persalt is separated and if necessary rinsed with alcohol, and the peracid formed can be collected in a substantial yield. The peroxidation yield depends closely upon the extent of dehydration of the starting product and upon the quantities of alkaline reactant employed. It is generally desirable to use a molecular ratio of alkali cation to anhydride function in the neighbourhood of 1. However, if the initial mixture contains an appreciable quantity of acid, it is desirable to take account thereof and to adjust the quantity of alkali in relation to the sum of the anhydride functions $+\frac{1}{2}$ acid function. It may also be necessary to use ratios of cation to anhydride function higher than 1, for example of 2, when hydrides of benzene polycarboxylic acids are peroxidised.

The yields of the perhydrolysis of the anhydrides, like that of the precipitation, are often of the order of 90% or more, so that the total yield may reach 80–95%.

For example, in the case of perphthalic acid, the results obtained are indicated by the curves I, II and III of the accompanying figure.

In this diagram, the ratios of sodium hydroxide to phthalic anhydride are plotted along the abscissa and the yields are plotted along the ordinates.

The curve (I) represents the variation of the yield of the monoperphthalic acid formed to phthalic anhydride ($R_1$) as a function of the molecular ratio of NaOH to phthalic anhydride, denoted by X.

The curve (II) represents the yield of monoperphthalic acid separated to phthalic anhydride ($R_2$) as a function of the molecular ratio of NaOH to phthalic anhydride, and the curve (III) as a function of the same molecular ratio, represents the yield of monoperphthalic acid separated to monoperphthalic acid formed.

The persalts thus isolated, separated or dried, are directly treated with a strong mineral acid, such as sulphuric acid or phosphoric acid, concentrated or partially diluted with water. For example, the persalt may be slowly added to a cooled solution of 30% sulphuric acid. After malaxation at a temperature of 10° to 30° C., the mixture is dried, for example in an oven at 40° C. or under the ambient conditions.

In a variant of the process of the invention, the persalt is treated with a small volume of solvent containing a strong mineral acid, for example methanol or ethanol containing sulphuric acid, which has the effect of bringing about a solubilisation of the peracid and a deposition of the mineral salt, which is eliminated by filtration. The organic solution of the peracid is then atomised in a current of hot air at a temperature from 80° to 100° C.

As may be observed from the following examples, these various manipulations involve only very small losses of active oxygen, the quantity of peracid found in the final product, which is dry and stable, often being equal to 80% of the peracid formed.

The quantity of mineral acid to be employed for the treatment of the persalt is between 0.5 and 2.0 acid equivalents per alkali cation present in the persalt.

More simply, when the yield of the precipitation of the persalt is 80% or more, the quantity of acid to be employed is calculated from the quantity of cation introduced in the course of the reaction in which the anhydrides are perhydrolysed. Under these conditions, for example, a ratio of $H^+$ to cation equal to 1.1 or 1.2 is chosen.

The process can readily be adapted to continuous manufacture, the organic salt being reused after separation of the persalt and reconstitution of a concentration fixed for all the anhydride and residual peracid constituents and for the hydrogen peroxide. Between each operation, only the dense aqueous solution is removed by decantation, and it may be combined with the persalt precipitate at the time of the acidification of the latter or it may be separately treated, for example acidified and then extracted with a solvent, from which the peracid will be crystallised by conventional means. At no time does there occur any evaporation or distillation of solution containing active oxygen. In some cases, in order to avoid the production of an over-abundant precipitate which might clog the installations, an incomplete neutralisation of the reaction mixture is effected, using a deficiency of alkali cation, and the unisolated peroxides are recycled.

The benzene polycarboxylic peroxyacid acids, optionally halogenated, nitrated, sulphonated, hydrogenated or alkylated on one or more carbons of the aromatic nucleus, and more especially 3-nitro- and 4 - nitromonoperphthalic acids, 3 - chloro- and 4 - chloromonoperphthalic acids, tetrachloromonoperphthalic acid, pertrimellitic or 4-carboxymonoperphthalic acid, monoperpyromellitic or 4,5 - dicarboxymonoperphthalic acid, diperpyromellitic acid, hexahydromonoperphthalic acid, 4 - monochloro- and 5 - monochlorotetrahydromonoperphthalic acids, 4,5-dichlorotetrahydromonoperphthalic acid, 4,5 - dibromo-tetrahydromonoperphthalic acid, 4,5 - dibromomonoper-carboxynadic acid, in the free state or in the form of their alkali and ammonium salts, prepared by the process according to the present improvement are new compounds and thus form part of the invention.

These percompounds are useful as oxidising agents and more especially as bleaching agents. 3-nitro- and 4-nitro-monoperphthalic acids, separately or in admixture, in the free state or in the form of monosodium salt, are the preferred compounds of the invention as active agent in the bleaching compositions.

The examples given in the following illustrate the present invention without in any way limiting it.

*Example 1*

14 cc. of hydrogen peroxide in a concentration of 65.5% and 200 cc. of ethyl acetate are mixed. To this reaction medium are added 50 g. of phthalic anhydride, and gaseous ammonia is then bubbled in until a stable pH value of 3.7 is reached. The mixture is filtered and the precipitate is separated and dried in the open air, at 25° C. for 2 hours. It then titrates 94.5% of acid ammonium monoperphthalate. The molecular yield of the peroxidation is 98.5% and that of the precipitation is 71% calculated on the phthalic anhydride employed.

*Example 2*

10 cc. of hydrogen peroxide in a concentration of 85% and 200 cc. of ethyl acetate are mixed. To this reaction medium are aded 50 g. of phthalic anhydride and then 14.3 g. of KOH dissolved in 14 cc. of water, the molecular ratio of potassium hydroxide to anhydride being 0.75. By filtration and separation, potassium monoperphthalate is isolated, which titrates 82.6% of monopotassium monoperphthalate when dried for 6 hours at 35° C. The molecular yield of the peroxidation is 91%, and that of the precipitation is 73% calculated on the anhydride employed.

*Example 3*

10 cc. of hydrogen peroxide in a concentration of 85% and 200 cc. of ethyl acetate are mixed. To this reaction medium are added 50 g. of phthalate anhydride and then 10.2 g. of NaOH dissolved in 10 cc. of water, the molecular ratio of sodium hydroxide to anhydride being 0.75. By filtration and separation, the sodium persalt is isolated and, when dried for 3 hours at 35° C. it titrates 82.5% of monosodium monoperphthalate. The monosodium phthalate content and the water content in the dry product are determined and are 11% and 7% respectively. The yield of the peroxidation is 92%, and that of the precipitation 75%, calculated on the phthalic anhydride.

*Example 4*

10.3 cc. of hydrogen peroxide in a concentration of 70% and 150 cc. of heptyl acetate are mixed. To this reaction medium are added 37 g. of phtnalic anhydride, whereafter gaseous ammonia is bubbled in until a stable pH value of 4.2 is reached. The molecular yield of the peroxidation is 96%. After one hour, the product is separated and allowed to dry partially under the ambient conditions for 2 hours. There is then found a titre of 69.7% of peracid and a precipitation yield calculated on the peracid formed of 96%. The product is thereafter malaxated with 16.6 cc. of 50%-by-volume sulphuric acid. The pulp thus obtained is dried in an oven at 40° C. for 4 hours. There is thus obtained a white powder containing 63% of peracid, in a molecular yield of 92% calculated on the peracid separated and of 85% calculated on the phthalic anhydride. This product is stable until 100° C. (thermogramme at 120° C. per hour) and keeps without deterioration at 25° C.

*Example 5*

10.3 cc. of hydrogen peroxide in a concentration of 70% and 150 cc. of ethyl acetate are mixed. To this reaction medium are added 37 g. of phthalic anhydride and then 13.4 cc. of sodium hydroxide in a concentration of 74.8% in water, the molecular ratio of sodium hydroxide to phthalic anhydride being 1. The monoperphthalate precipitate separated is treated with 100 cc. of methanol containing 8.3 cc. of sulphuric acid. The insoluble matter is separated by filtration and washed with 50 cc. of methanol. This precipitate weighs 18.8 g. and contains no peracid. It represents 85% of the sulphate and bisulphate mineral salts resulting from the treatment with sulphuric acid. The methanolic extracts which contain, in the form of peracid, 77% of the phthalic anhydride employed, are collected and atomised in a hot-air injection apparatus at 80° C. There are thus collected 40 g. of a dry powder titrating 75% of monoperphthalic acid.

*Example 6*

10.3 cc. of hydrogen peroxide in a concentration of 70% and 150 cc. of butyl acetate are mixed. To this reaction medium are added 37 g. of phthalic anhydride and then 13.9 cc. of sodium hydroxide in a concentration of 71.8% in water, the molecular ratio of sodium hydroxide to phthalic anhydride being 1. The yield of the peroxidation is 93% and the precipitate contains, in the form of monoperphthalate, 98.4% of the peracid formed. After separation, this precipitate is malaxated with 16.6 cc. of 50%-by-volume sulphuric acid. The pulp thus obtained is dried at 40° C. in 4 hours. It titrates 58.8% of monoperphthalic acid and contains 94.8% of the separated peracid, the yield calculated on the phthalic anhydride being 86.5%. This product is stable until 100° C. (thermogramme at 120° C. per hour) and keeps without deterioration at 25° C.

*Example 7*

In a series of successive operations, the ethyl acetate liquors, in which sodium monoperphthalate has previously been precipitated, are reused.

There is reconstituted in each cycle a reaction medium consisting of 150 cc. of water-saturated ethyl acetate, 0.275 mole of hydrogen peroxide (by partial addition of 70% hydrogen peroxide), the equivalent of 0.250 mole of phthalic anhydride (consisting partly of residual peracid and of an addition of phthalic anhydride) and 0.250 mole of sodium hydroxide added in 76% aqueous solution. After four successive operations, there have been consumed 141.1 g. of pthalic anhydride (0.953 mole), 40.6 cc. of 70% hydrogen peroxide (1.08 mole), 40 g. of sodium hydroxide (1 mole) and 38 cc. of ethyl acetate, to obtain 170.3 g. of peracid in a yield of 95.5% calculated on the anhydride. In all, 18 cc. of decanted aqueous solution containing 3.7 g. of peracid (0.02 mole) have been eliminated and a total of 158.95 g. of peracid, i.e. 95.7% of the peracid formed, has been collected in the form of persalt by separation. The successive peracid titres of each separated fraction were 65.9%, 66.5%, 65.7% and 63.4%.

All of the monoperphthalate is treated with 66.4 cc. of 50%-by-volume sulphuric acid. This pulp is dried in an oven at 40° C. The dry product weighs 240 g. and titrates 58.9% of peracid. In addition, it contains 7.5% of phthalic acid, 13% of acid sodium sulphate and 19.2% of neutral sodium sulphate. The yield of the acidification phase is 89%.

*Example 8*

2.1 ml. of hydrogen peroxide in a concentration of 70%, i.e. 0.055 mole, and 40 ml. of ethyl acetate are mixed. To this reaction medium are added 11.12 g. of a preparation of 3-nitrophthalic anhydride having a purity of 86.8%, i.e. 0.050 mole, and then 3.5 ml. of an aqueous 72% sodium hydroxide solution, i.e. 0.064 mole, the temperature remaining below 25° C. One hour after the end of the addition of sodium hydroxide, the mixture is filtered and there are collected 19.4 g. of product titrating 54.1% of monosodium salt of 3-nitromonoperphthalic acid. After drying, the titre of this product rises to 66% of persalt, the molecular yield in relation to the hydride employed is 84% and the filtrate only contains traces of hydrogen peroxide and peracid. The monosodium persalt is then added to 20% sulphuric acid in cooled water and in a quantity such that the molecular ratio of $H^+/NaOH$ employed is 1.2. After drying, there is obtained a product titrating 51.9% of peracid with a molecular yield of peracid of 82% calculated on the anhydride employed.

*Example 9*

There are mixed 2.1 ml. of hydrogen peroxide in a concentration of 70% and 40 ml. of water-saturated ethyl acetate. To this reaction medium are added 9.12 g. of a mixture of 3-and 4-monochlorophthalic anhydrides having an anhydride content of 99%, and then 3.45 g. of anhydrous potassium carbonate, i.e. 0.025 mole, the temperature not exceeding 15° C. during the addition, and then being raised to and maintained at 25° C. with stirring for one hour after the addition. After filtration, there are collected 21 g. of product titrating 59.7% of monopotassium salts of 3- and 4-monochloromonoperphthalic acids, the molecular yield of the precipitation being 98% calculated on the anhydride employed. After drying, the titre of this product rises to 75.7%.

*Example 10*

There are mixed 4.2 ml. of hydrogen peroxide in a concentration of 70%, i.e. 0.11 mole and 80 ml. of water-saturated ethyl acetate. To this reaction medium are added 21.7 g. of 3,4-dichlorophthalic anhydride in a purity of 100%, i.e. 0.1 mole, and then 8.5 ml. of an aqueous 66% potassium hydroxide solution, i.e. 0.1 mole, the temperature remaining below 20° C. One and a half hours after the end of the addition of the potassium hydroxide, the mixture is filtered and there are collected 30 g. of product titrating 49.8% of monopotassium salt of 3,4-dichloromonoperphthalic acid. The yield of the peroxidation reaction is 80.8%, and that of the precipitation is 52% calculated on the anhydride employed.

*Example 11*

There are mixed 8.5 ml. of hydrogen peroxide in a concentration of 70%, i.e. 0.22 mole, and 150 ml. of ethyl acetate. To this reaction medium are added 59.6 g. of a preparation of tetrachlorophthalic anhydride in a purity of 96%, i.e. 0.20 mole of anhydride, and then 11.1 ml. of a 72% aqueous sodium hydroxide solution, i.e. 0.20 mole, the temperature remaining at about 20° C. One hour after the end of the addition of the sodium hydroxide, the mixture is filtered and there are collected 86 g. of product titrating 75.6% of monosodium salt and tetrachloromonoperphthalic acid, the titre of this product rising, after drying, to 81.2% of persalt, while the molecular yield calculated on the anhydride employed is 95%.

*Example 12*

There are gradually added to 26.4 ml. of pre-cooled 20 sulphuric acid 54.4 g. of a product titrating 69% of monosodium salt of tetrachloromonoperphthalic acid. The temperature is maintained below 10° C. in the course of the addition and during the malaxation. At the end of the operation, there are found 95% of the peracid employed. The product is then dried at 35° C. for 3 hours, whereby it loses all the water of dilution of the sulphuric acid. The total yield of the acidifying and drying operations is 90%. The dry product titrates 49.6% of tetrachloromonoperphthalic acid.

*Example 13*

There are mixed 2.1 ml. of hydrogen peroxide in a concentration of 70% and 40 ml. of ethyl acetate. To this reaction medium are added 11.3 g. of a preparation of 4-carboxyphthalic or trimellitic anhydride in a purity of 84.2%, i.e. 0.050 mole, and then 3.6 ml. of a 72% aqueous sodium hydroxide solution, i.e. 0.064 mole, the temperature not exceeding 20° C. One hour after the end of the sodium hydroxide addition, the mixture is filtered and there are collected 24 g. of product titrating 36.9% of monosodium salt of 4-carboxymonoperphthalic acid, the yield from the precipitation being 71.4% calculated on the anhydride employed. After drying, the titre of this product rises to 44.7% of persalt.

*Example 14*

There are mixed 4.0 ml. of hydrogen peroxide in a concentration of 70%, i.e. 0.1 mole, and 50 ml. of ethyl acetate. To this reaction medium are added 10.9 g. of a preparation of benzene-1,2,4,5-tetracarboxylic or pyromellitic anhydride in a purity of 96.1%, i.e. 0.050 mole, and then 5.12 ml. of an aqueous 78% sodium hydroxide solution, i.e. 0.1 mole, the temperature being maintained at about 20° C. One hour after the completion of the addition of sodium hydroxide, the mixture is filtered and there are collected 26 g. of product titrating 47.4% of disodium salt of diperoxypyromellitic acid, the yield from the precipitation being 74.7% calculated on the anhydride employed. The disodium persalt is then aded to 50% sulphuric acid in water, in a quantity such that the ratio of $H^+/NaOH$ employed is 1.2. After drying, there is obtained a product titrating 37.8% of diperacid, i.e. 4.25% of active oxygen, the yield from the final acidifying and drying operations being 80%.

*Example 15*

There are mixed 8.4 ml. of hydrogen peroxide in a concentration of 70%, i.e. 0.22 mole, and 160 ml. of ethyl acetate. To this reaction medium are added 30.8 g. of hexahydrophthalic anhydride in a purity of 100%, i.e. 0.2 mole, whereafter gaseous ammonia is bubbled into the medium until the pH value of the latter reaches 8 and remains at this value, the temperature not exceeding 25° C.

One hour later, the mixture is filtered and there are collected 45 g. of product titrating 68.8% of the peroxyacid ammonium salt of hexahydroperphthalic acid, the yield from the precipitation being 75.5% calculated on the anhydride employed. 96% sulphuric acid is added to the ammonium persalt in a proportion of 1.2 $H^+$ per mole of anhydride employed. After drying, there is obtained a product titrating 51.5% of peracid. The yield from the final acidifying and drying operation is 98%.

*Example 16*

There are mixed 2.1 ml. of hydrogen peroxide in a concentration of 70%, i.e. 0.055 mole and 50 ml. of ethyl acetate. To this reaction medium are added 16.2 g. of a dibromonadic anhydride preparation in a purity of 100%, i.e. 0.050 mole, and then 2.50 ml. of a 78% aqueous sodium hydroxide solution, i.e. 0.050 mole, the temperature being maintained at 20° C. One hour after the end of the addition of the sodium hydroxide, the mixture is filtered and there are collected 26 g. of a product titrating 57.3% of monosodium salt of dibromomonopernadic acid, the yield from the precipitation being 78.4% calculated on the anhydride employed. 50% sulphuric acid is added to the sodium persalt in a proportion of 1.2 $H^+$ per mole of sodium hydroxide employed. After drying, there is obtained a product titrating 52.7% of peracid, the yield from the acidifying and drying operation being 85%.

*Example 17*

There are mixed 3.5 ml. of hydrogen peroxide in a concentration of 70%, i.e. 0.090 mole and 90 ml. of ethyl acetate. To this reaction medium are added 18.3 g., i.e. 0.082 mole, of a preparation of dichlorocyclohexane dicarboxylic anhydride in a purity of 100%, obtained by chlorination of tetrahydrophthalic anhydride, and then 4.6 ml. of a 78% aqueous sodium hydroxide solution, i.e. 0.082 mole, the temperature being maintained at about 20° C. One hour after the end of the addition of sodium hydroxide, the suspension is treated with cooled 10% sulphuric acid and extracted in three stages with ethyl ether. There is isolated from the ethereal extracts a product titrating 51.4% of peracid in a yield of 43% calculated on the anhydride employed.

*Example 18*

There are mixed 2.1 ml. of hydrogen peroxide in a concentration of 70%, i.e. 0.055 mole, and 50 ml. of ethyl acetate. To this reaction medium are added 15.6 g., i.e. 0.050 mole, of dibromotetrahydrophthalic anhydride in a purity of 99.8%, and then 2.56 ml. of a 78% aqueous sodium hydroxide solution, i.e. 0.050 mole, the temperature being maintained at 18° C. One hour after the completion of the addition of sodium hydroxide, the mixture is filtered and there are collected 29 g. of product titrating 57.2% of monosodium salt of dibromotetrahydromonoperphthalic acid, the yield from the precipitation being 90.2%. 96% sulphuric acid is added to the sodium persalt in a proportion of 1.2 H+ per mole of sodium hydroxide employed. After drying, there is obtained a product titrating 58.2% of peracid, the yield from the acidifying and drying operation being 84%.

*Example 19*

The decolorising powers of the products prepared in accordance with the invention in salt form and in acid form are compared by means of a standard test at 60° C. The decolorising power is measured by an aqueous carbon black solution containing sulphur, marketed under the name "Sulfanol MBS," which is employed in solubilised form. A carbon black solution having an optical density equal to 0.6 (thickness 10 mm., green filter) is prepared, this solution being appropriately buffered.

To this solution, heated to 60° C., are added in a proportion of 100 mg. of active oxygen per litre the peracids or their salts prepared as in the preceding examples. The bleaching effect is measured by colorimetry and expressed as a percentage of decoloration based upon a standard product comprising no oxidising agent:

% of decoloration=

$$\frac{\text{optical density of the standard} - \text{optical density of the tested specimen}}{\text{optical density of the standard}}$$

The results are set out in the following table:

| Product | Mg. active oxygen/litre | pH before and after action | Percent of decoloration |
|---|---|---|---|
| H₂O₂* | 100 | 8.5 | 5 |
| Monoperphthalic acid | 100 | 8.5–8.4 | 55 |
| Monosodium 3-nitromonoperphthalate | 100 | 8–7.8 | 86 |
|  | 50 | 8.1–7.8 | 62 |
| Monopotassium 3-chloro- and 4-chloromonoperphthalate | 100 | 8.4 | 64 |
| Tetrachloromonoperphthalic acid | 100 | 8.5–8.3 | 66 |
| Monosodium hexahydromonoperphthalate | 100 | 8.0–7.5 | 24 |
| Monosodium monopertrimellitate | 100 | 8.2–7.9 | 26 |
| Disodium diperpyromellitate | 100 | 8.7–7.2 | 17 |
| Monoperpyromellitic acid | 100 | 7.3 | 24 |
| Dibromomonopernadic acid | 50 | 8.5–8.4 | 63 |
| Monosodium dibromotetrahydromonoperphthalate | 50 | 8.5–8.4 | 93 |
| Dichlorotetrahydromonoperphthalic acid | 100 | 10.0–8.2 | 70 |

*For comparison.

The high decolorising power of the bromocyclohexanecarboxylic peracids is partly due to the bromine liberated in alkaline oxidising medium and therefore does not completely reflect the true action of the percarboxylic function. Apart from this particular case of an indirect action, it is noted that all the peracids having an electronegative atom or radical on the aromatic or saturated nucleus have an accentuated oxidising power.

For example, the high activity of mononitromonoperphthalic acid will be observed. The nitro derivatives in the 3- or 4-position which are employed either separately or in admixture in a proportion of only 50 mg. of active oxygen per litre produce at a pH value of 8 and under the previously defined conditions a decoloration of 62%, which is thus higher than that obtained by the action of a double dose of active oxygen emanating from unnitrated monoperphthalic acid.

*Example 20*

The activity as an expoxidation agent of a product prepared under conditions similar to those of Example 7 and titrating 60.1% of monoperphthalic acid is tested by reacting this product, in aqueous phase at 37° C. and for one hour, with methyl oleate in an equimolecular proportion in relation to the peracid. There is obtained from an ester having an iodine number of 85.6 an epoxidised product having an oxirane number of 4.1%. The extent of epoxidation in relation to the initial bonds is 78.2%. The by-product content is nil.

Having regard to the readiness with which these peracids can be obtained, both from the industrial and economic viewpoints, and their satisfactory behaviour in storage at 25° C. for example in the form of the sodium salt, their use can be recommended either as bleaching agents or as oxidation agents of very general value.

What I claim is:

1. Process for the preparation of salts of peroxyacids of the formula

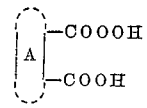

in which A is a radical selected from the group consisting of phenyl and cyclohexyl substituted on the ring in at least one of the positions 3, 4, 5, 6 by at least one member of the group consisting of hydrogen, halogen, nitro, carboxy, percarboxy and lower alkyl which comprises reacting the anhydrides corresponding to the desired peracids and hydrogen peroxide used in a proportion of 0.5 to 1.5 atom of active oxygen per dicarboxylic anhydride function, said reaction being conducted at temperatures of +10° C. to +30° C. within an organic medium in the presence of an alkali mineral agent, characterized in that said organic medium is an ester of a lower carboxylic acid and an alkanol, the ester containing at most 10 carbon atoms.

2. Process of preparation according to claim 1, characterized in that the persalts are separated from the reaction mixture in the form of a concentrated aqueous solution.

3. Process of preparation according to claim 1, characterized in that the persalts after separation from the reaction mixture are converted into the corresponding acids by treatment in the dry state with a mineral acid.

4. Process of preparation according to claim 1, characterized in that the persalts after separation from the reaction mixture are converted into the corresponding acids by treatment in solution with a mineral acid.

5. Process of preparation according to claim 1, characterized in that said organic medium is an alkyl acetate.

6. Process of preparation according to claim 1, and characterized in that the alkaline agent is a member of the group consisting of the hydroxides and carbonates of alkali metals and ammonia.

7. Process of preparation according to claim 1, characterized in that the reaction of the hydrogen peroxide with the anhydrides is continuously performed, the reaction mixture is incompletely neutralised with mineral acid, and the unisolated persalt is recycled.

8. Process of preparation according to claim 1, characterized in that the salts of peroxyacids are treated with a mineral acid in solution in a lower aliphatic alcohol, and the resultant solutions are atomised after filtration.

9. Process of preparation according to claim 8, characterized in that the mineral acid is employed in such a quantity that there are 1 to 2 acid equivalents per alkali cation.

References Cited

UNITED STATES PATENTS

| 2,284,477 | 5/1942 | Reichert et al. | 260—502 |
| 3,232,979 | 2/1966 | Blumbergs | 260—502 |
| 3,247,244 | 4/1966 | Blumbergs et al. | 260—502 |

LORRAINE A. WEINBERGER, *Primary Examiner.*

M. WEBSTER, *Assistant Examiner.*